United States Patent
Wang et al.

(10) Patent No.: US 9,733,508 B2
(45) Date of Patent: Aug. 15, 2017

(54) TOUCH LIQUID CRYSTAL DISPLAY DEVICE

(71) Applicant: Shanghai Tianma Micro-Electronics Co., Ltd., Shanghai (CN)

(72) Inventors: Lihua Wang, Shanghai (CN); Qijun Yao, Shanghai (CN); Jun Ma, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 346 days.

(21) Appl. No.: 14/180,306

(22) Filed: Feb. 13, 2014

(65) Prior Publication Data

US 2014/0160376 A1    Jun. 12, 2014

Related U.S. Application Data

(63) Continuation-in-part of application No. PCT/CN2012/086339, filed on Dec. 11, 2012.

(30) Foreign Application Priority Data

Aug. 27, 2012  (CN) .......................... 2012 1 0308960

(51) Int. Cl.
*G02F 1/1333* (2006.01)
*G02F 1/1343* (2006.01)
(Continued)

(52) U.S. Cl.
CPC ........ *G02F 1/13338* (2013.01); *G02F 1/1343* (2013.01); *G06F 3/041* (2013.01);
(Continued)

(58) Field of Classification Search
CPC .... G02F 1/13338; G06F 3/0412; G06F 3/047; G06F 3/041; G06F 3/0418; G06F 3/044;
(Continued)

(56) References Cited

U.S. PATENT DOCUMENTS

| 2009/0096760 A1* | 4/2009 | Ma ...................... G02F 1/13338 345/174 |
| 2011/0242444 A1* | 10/2011 | Song ..................... G06F 3/0412 349/43 |
| 2012/0086654 A1* | 4/2012 | Song ..................... G06F 3/0412 345/173 |

FOREIGN PATENT DOCUMENTS

| CN | 102338945 A | 2/2012 |
| CN | 102541334 A | 7/2012 |

(Continued)

OTHER PUBLICATIONS

European Search Report for European Application No. 12883850.5, mailed on May 13, 2015, 6 pages total.

*Primary Examiner* — Jessica M Merlin
(74) *Attorney, Agent, or Firm* — Alston & Bird LLP

(57) ABSTRACT

A touch liquid crystal display device is disclosed. The display device includes a first substrate and a second substrate arranged oppositely, and a touch layer being formed on the first substrate. The touch layer includes a plurality of drive electrodes and a plurality of sensing electrodes thereon, where the drive and sensing electrodes include a plurality of transverse metal wires and a plurality vertical metal wires interlaced with each other. In addition, the second substrate includes a plurality of transverse drive lines and a plurality of vertical drive lines, where the number of transverse metal wires is less than the number of transverse drive lines, or the number of vertical metal wires is less than the number of vertical drive lines.

24 Claims, 17 Drawing Sheets

(51) Int. Cl.
*G06F 3/041* (2006.01)
*G06F 3/044* (2006.01)
*G06F 3/047* (2006.01)

(52) U.S. Cl.
CPC .............. *G06F 3/044* (2013.01); *G06F 3/047* (2013.01); *G06F 3/0418* (2013.01); *G06F 2203/04103* (2013.01); *G06F 2203/04104* (2013.01); *G06F 2203/04107* (2013.01)

(58) Field of Classification Search
CPC . G06F 2203/04103; G06F 2203/04104; G06F 2203/04107
See application file for complete search history.

(56) References Cited

FOREIGN PATENT DOCUMENTS

| | | |
|---|---|---|
| EP | 2738596 A1 | 6/2014 |
| JP | 2008090623 A | 4/2005 |
| WO | WO2010107271 A2 | 9/2010 |

* cited by examiner

TOUCH LIQUID CRYSTAL DISPLAY DEVICE

CROSS-REFERENCES TO RELATED APPLICATIONS

This application claims priority to and is a continuation-in-part of PCT/CN2012/086339, filed on Dec. 11, 2012, and entitled "TOUCH LIQUID CRYSTAL DISPLAY DEVICE", which application claims the benefit of priority to Chinese Patent Application No. 201210308960.5, filed with the Chinese Patent Office on Aug. 27, 2012, and entitled "TOUCH LIQUID CRYSTAL DISPLAY DEVICE", the contents of which are incorporated herein by reference in their entirety.

TECHNICAL FIELD

The invention relates to the field of touch display technology, and in particular to a touch liquid crystal display device.

BACKGROUND OF THE INVENTION

As an input medium, the touch screen is a simple, convenient, and natural device for human-computer interaction. Therefore, the touch screen is increasingly applied in various types of electronic products, such as mobile phones, notebook computers, and MP3/MP4s. In order to reduce the cost of various types of electronic apparatuses, and to make the various types of electronic apparatuses lighter and thinner, generally the touch screen is integrated in a liquid crystal display panel. According to the work principle and the medium for transferring information, the touch screen can be classified as four types: the resistive touch screen, the capacitive touch screen, the infrared touch screen, and the surface acoustic wave touch screen. Due to the advantages of long service life, high light transmittance, and supporting multi-touch and so on, the capacitive touch screen becomes the mainstream touch screen technology presently. However, in the prior art the touch sensitivity of the capacitive touch screen is low.

BRIEF SUMMARY OF THE INVENTION

One inventive aspect is a touch liquid crystal display device. The display device includes a first substrate and a second substrate arranged oppositely, and a touch layer being formed on the first substrate. The touch layer includes a plurality of drive electrodes and a plurality of sensing electrodes thereon, where the drive and sensing electrodes include a plurality of transverse metal wires and a plurality vertical metal wires interlaced with each other. In addition, the second substrate includes a plurality of transverse drive lines and a plurality of vertical drive lines, where the number of transverse metal wires is less than the number of transverse drive lines, or the number of vertical metal wires is less than the number of vertical drive lines.

Another inventive aspect is a touch liquid crystal display device including a first substrate and a second substrate arranged oppositely, and a touch layer being formed on the first substrate. The touch layer includes a plurality of drive electrodes and a plurality of sensing electrodes thereon, where the drive and sensing electrodes include a plurality of traverse metal wires and vertical metal wires interlaced with each other. In addition, the second substrate includes a plurality of traverse drive lines and a plurality of vertical drive lines thereon, where the width of the traverse metal wires is less than the width of the traverse drive lines, or the width of the vertical metal wires is less than the width of the vertical drive lines.

BRIEF DESCRIPTION OF THE DRAWINGS

In order to illustrate the technical solutions of the embodiments of the invention or the prior art more clearly, accompanying drawings required for the description of the embodiments or the prior art will be introduced briefly hereinafter. Obviously, the described accompanying drawings below are only some embodiments of the invention, and other accompany drawings can be obtained by those skilled in the art according to theses accompany drawings without any creative work.

DETAILED DESCRIPTION OF THE INVENTION

Figure 1:
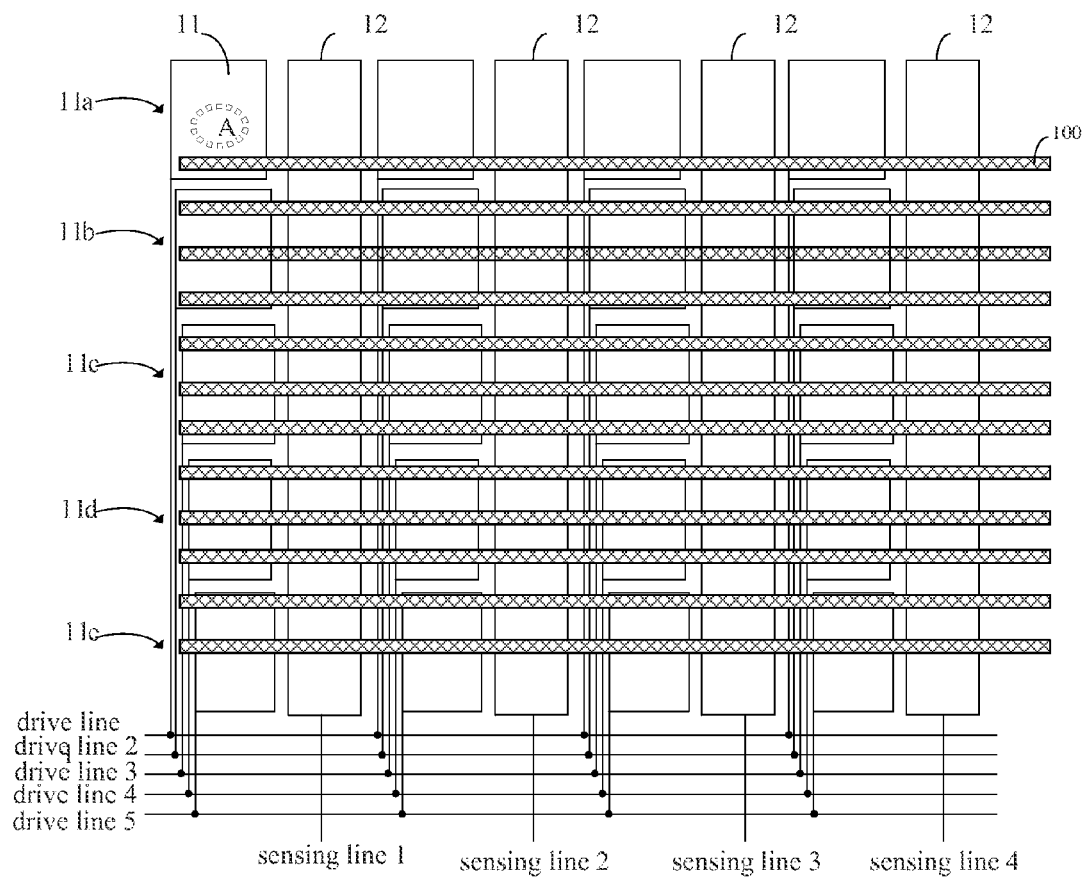
FIG. 1 is a schematic diagram of a single-layer touch screen in the prior art.
Figure 2:
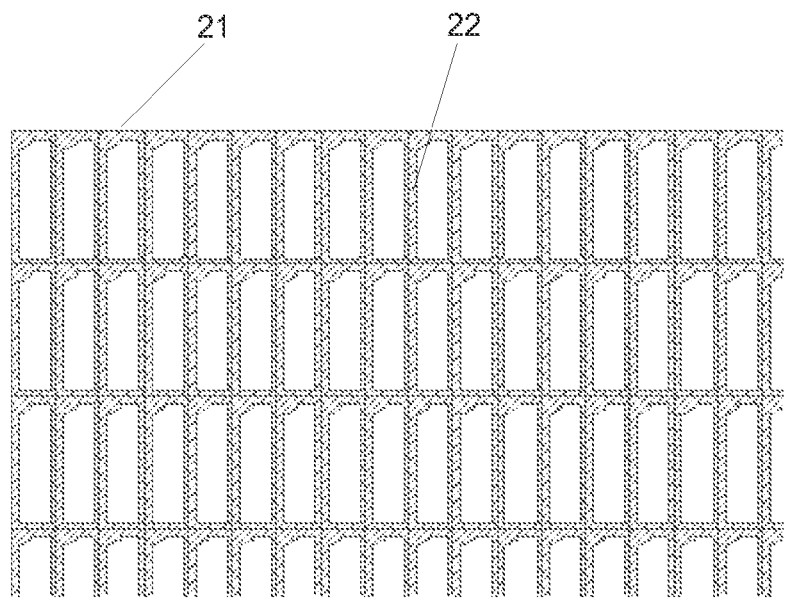
FIG. 2 is a schematic structural diagram of a region A in the single-layer touch screen described in FIG. 1.

Reference is made to FIG. 1 which shows a schematic diagram of a single-layer touch screen in the prior art. In the invention, as an example, the touch screen is a single-layer touch screen, and a drive electrode and a sensing electrode adjacent to each other in the touch screen are arranged in a transverse direction, but the invention is not limited thereto. In the single-layer touch screen, a drive layer and a sensing layer are located in the same layer; the drive layer includes multiple drive electrodes 11 regularly arranged to form drive electrodes 11a, 11b, 11c, 11d, and 11e, the drive electrodes 11 in each row are interconnected via peripheral drive lines. The sensing layer includes multiple sensing electrodes 12, and the multiple sensing electrodes 12 are arranged alternately with each column of drive electrodes 11, and a mutual-capacitance is formed between each drive electrode 11 and the sensing electrode 12 adjacent to the drive electrode 11. Specifically, as shown in FIG. 2, both the drive electrode 11 and the sensing electrode 12 are composed of multiple metal wires interlaced with each other, i.e., both the drive electrode 11 and the sensing electrode 12 include metal grids composed of multiple transverse metal wires 21 and vertical metal wires 22 interlaced with each other.

Figure 3:
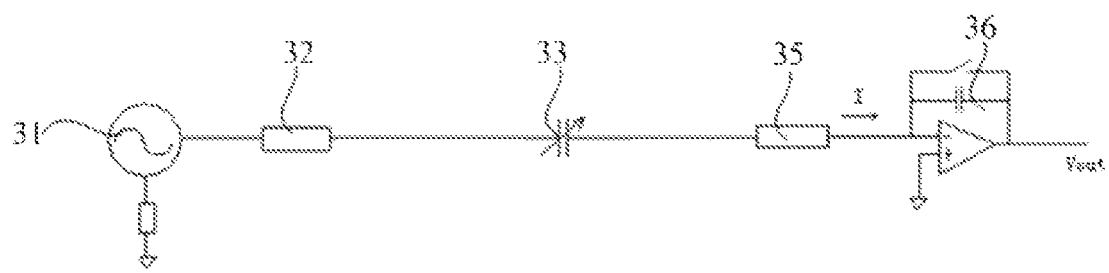
FIG. 3 is a schematic diagram of an equivalent circuit of the single-layer touch screen shown in FIG. 1.

Reference is made to FIG. 3 which shows a schematic diagram of an equivalent circuit of the single-layer touch screen shown in FIG. 1, the equivalent circuit includes: a signal source 31, a drive electrode resistance 32, a mutual-capacitance 33 between the drive electrode 11 and the sensing electrode 12, a sensing electrode resistance 35 and a detection circuit 36. Specifically, the signal source 31 is configured to apply a drive signal to the drive electrode 11; and the detection circuit 36 is configured to detect a signal. When a finger touches the touch screen, a part of electricity flows into the finger, the mutual-capacitance 33 between the drive electrode 11 and the sensing electrode 12 changes; weak current change caused by the change of the mutual-capacitance 33 is detected from the detection circuit 36, thereby determining the location where the finger touches.

However, in order to make the touch liquid crystal display lighter and thinner, in the prior art an in-cell liquid crystal display device is developed, in which the touch screen is integrated with the liquid crystal display panel. And generally the touch screen may be integrated on a color film substrate; an array substrate of the liquid crystal display panel is further provided with drive lines for driving each of pixel units to display; the color film substrate or the array substrate is further provided with a common electrode thereon, the drive lines generally include scanning drive lines and data drive lines. As shown in FIG. 1, the drive lines include multiple scanning drive lines 100 extending in a transverse direction, and the transverse metal wires 21 in the drive electrode 11 and the sensing electrode 12 are in one-to-one correspondence with the scanning drive lines.

By research, the inventor found that: since the spacing between the electrodes in the touch screen (i.e., the drive electrode 11 and the sensing electrode 12) and the common electrode, and the spacing between the electrode in the touch screen and the scanning drive lines 100, are small, and there are an insulation layer between the electrodes in the touch screen and the common electrode, and an insulation layer between the electrodes in the touch screen and the scanning drive lines 100, thereby a large parasitic capacitance is generated respectively between the transverse metal wires 21 in the electrodes of the touch screen and the common electrode and between the transverse metal wires 21 in the electrodes of the touch screen and the scanning drive lines 100. The parasitic capacitance will influence the mutual-capacitance 33 between the drive electrode 11 and the sensing electrode 12, thereby reducing the touch sensitivity of the liquid crystal display device.

Figure 4:
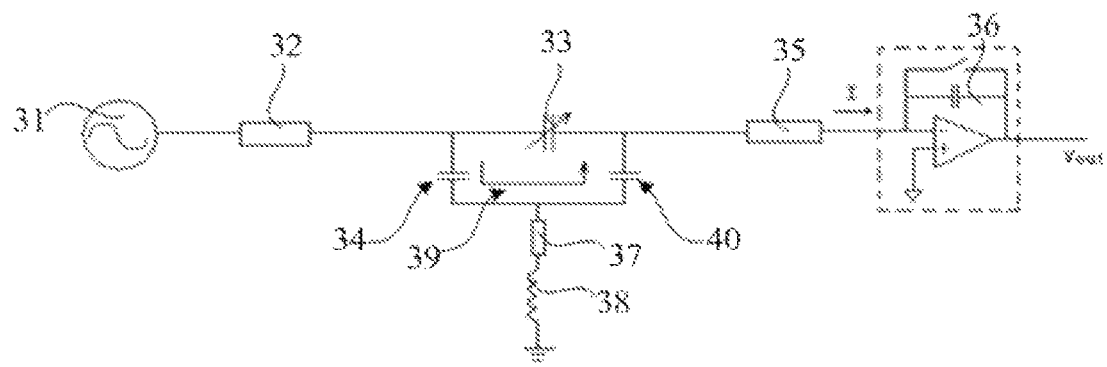
FIG. 4 is a schematic diagram of an equivalent circuit of an in-cell liquid crystal display device in the prior art.

By taking the parasitic capacitance between the common electrode and the transverse metal wires 21 in the electrodes of the touch screen as an example, when the liquid crystal display device is in a working state, a large drive parasitic capacitance 34 will be generated between the common electrode and the transverse metal wires 21 in the drive electrode 11, meanwhile a large sensing parasitic capacitance 40 will also be generated between the common electrode and the transverse metal wires 21 in the sensing electrode 12, as shown in FIG. 4.

When the signal source 31 sends an Alternate Current (AC) signal, the AC signal reaches the detection circuit 36 via the drive electrode resistance 32, the mutual-capacitance 33 and the sensing electrode resistance 35. For the AC signal sent from the signal source 31, the large drive parasitic capacitance 34 and the large sensing parasitic capacitance 40 have smaller capacitive reactance; furthermore, the common electrode resistance 37 and the common electrode induction 38 impede the AC signal flowing into the ground, so that the AC signal passes through the drive parasitic capacitance 34 and the sensing parasitic capacitance 40 with small capacitance reactance in sequence, so as to form a current circuit 39. However, after passing through the current circuit 39, the AC signal forms a large base signal at the detection circuit 36. Since the signal corresponding to the change of mutual-capacitance 33 is generally small, which can be easily covered by the large base signal, the detection circuit 36 is difficult to detect the signal corresponding to the change of the mutual-capacitance 33, thereby resulting in detection failure, and resulting in low touch sensitivity of the liquid crystal display device.

Likewise, as shown in FIG. 1, since the liquid crystal display device includes multiple transverse scanning drive lines 100, and the drive electrode 11 and the sensing electrode 12 adjacent to each other are arranged in a transverse direction (i.e., the extending direction of the scanning drive lines 100), a drive parasitic capacitance is generated between the scanning drive lines 100 and the transverse metal 21 in the drive electrode 11, and a sensing parasitic capacitance is generated between the scanning drive lines 100 and the transverse metal wires 21 in the sensing electrode 12, thereby influencing the mutual-capacitance 33 between the drive electrode 11 and the sensing electrode 12, and reducing the touch sensitivity of the liquid crystal display device.

In general, the array substrate of the liquid crystal display device is further provided with multiple data drive lines extending in a vertical direction. Similarly, if the drive electrode and the sensing electrode adjacent to each other are arranged in the extending direction of the data drive lines, a drive parasitic capacitance and a sensing parasitic capacitance are also generated between the data drive lines and the vertical metal wires 22 in the drive electrode and the sensing electrode, thereby influencing the mutual-capacitance 33 between the drive electrode 11 and the sensing electrode 12, and reducing the touch sensitivity of the liquid crystal display device.

In view of this, according to the invention, it is provided a touch liquid crystal display device, including a first substrate and a second substrate arranged oppositely. Generally, the first substrate is a color film substrate, the second substrate is an array substrate; a touch layer is formed on the first substrate, the touch layer is provided with multiple drive electrodes and sensing electrodes thereon, and both the drive electrodes and the sensing electrodes are composed of multiple transverse metal wires and vertical metal wires interlaced with each other; the second substrate is provided with multiple transverse drive lines and vertical drive lines thereon; where the number of the transverse metal wires is less than the number of the transverse drive lines, or the number of the vertical metal wires is less than the number of the vertical drive lines.

In order to make the objects, features, and advantages described above of the invention more clearly and easy to be understood, the specific implementing ways of the invention will be illustrated in detail in conjunction with the accompanying drawings and the embodiments hereinafter.

Many specific details are clarified in the following description for fully understanding the invention, but other ways different from the ways described herein may be employed to implement the invention, therefore the invention is not limited to specific embodiments disclosed hereinafter.

Figure 5:
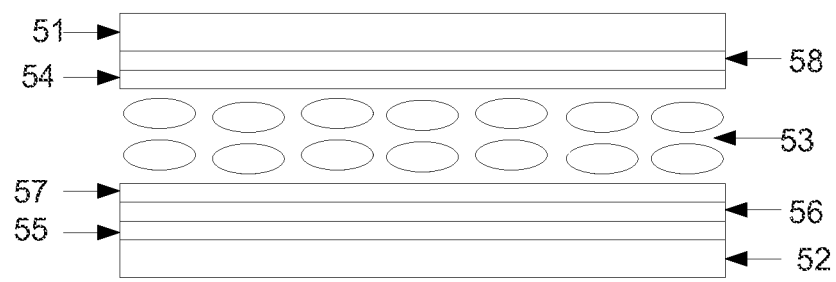
FIG. 5 is a schematic structural diagram of a touch liquid crystal display device provided according to an embodiment of the invention.
Figure 6:
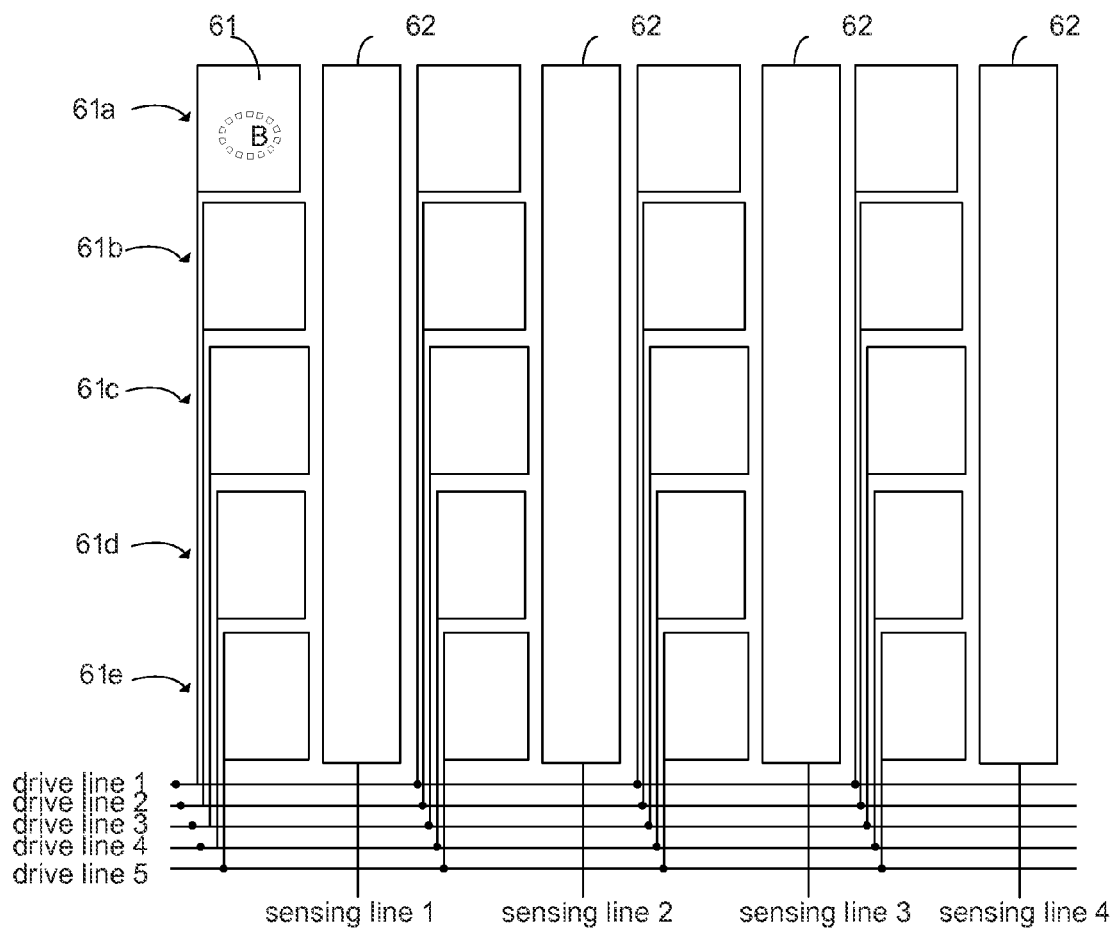
FIG. 6 is a schematic structural diagram of a touch layer in the touch liquid crystal display device provided according to an embodiment of the invention.
Figure 7:
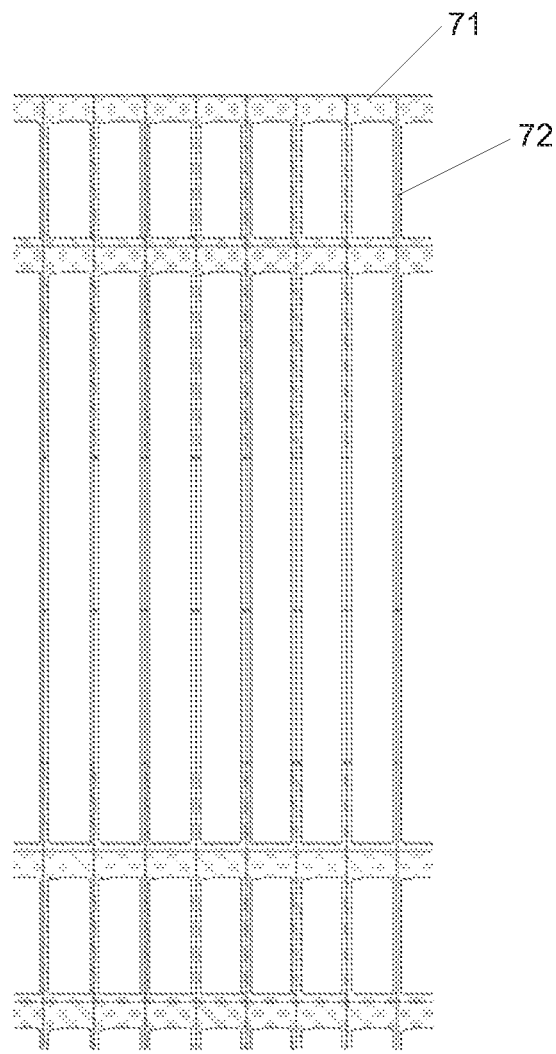
FIG. 7 is a schematic structural diagram of a region B in the touch layer shown in FIG. 6.

As shown in FIG. 5, a touch liquid crystal display device provided in the embodiment of the invention includes: a first substrate 51 and a second substrate 52 arranged oppositely; and a liquid crystal layer 53 located between the first substrate 51 and the second substrate 52, where the first substrate 51 is a color film substrate, the second substrate 52 is an array substrate, and a touch layer 54 is formed at the inner side of the first substrate 51 towards the second substrate 52. As shown in FIG. 6, the touch layer 54 is provided with multiple drive electrodes 61 and sensing electrodes 62 thereon, and both the drive electrodes 61 and the sensing electrodes 62 are composed of multiple transverse metal wires 71 and vertical metal wires 72 interlaced with each other. As shown in FIG. 7, FIG. 7 is a schematic structural diagram of a region B of the touch layer shown in FIG. 6, i.e., both the drive electrodes 61 and the sensing electrodes 62 are metal grids composed of multiple transverse metal wires 71 and vertical metal wires 72 interlaced with each other, and the drive electrode 61 and the sensing electrode 62 adjacent to each other are arranged in a transverse direction. From bottom to top, the second substrate 52 is provided with a TFT array layer 55, a pixel electrode layer 56 and a common electrode layer 57 in sequence, where the TFT array layer 55 includes multiple transverse scanning drive lines (not shown in the Figure), and the number of the transverse metal wires 71 is less than the number of the transverse scanning drive lines.

In the touch liquid crystal display device provided in the embodiment of the invention, a light-shielding layer 58 is also provided between the first substrate 51 and the touch layer 54, and in a direction perpendicular to the light-shielding layer 58, a projection of a light transmission region of the touch layer 54 on the light-shielding layer 58 is in a projection of a light transmission region of the light-shielding layer 58, thereby avoiding the case of light leakage of the touch liquid crystal display device. Specifically, the light-shielding layer 58 is a black matrix layer for sheltering the metal wirings on the second substrate 52 (i.e., the array substrate), such as scanning drive lines, data drive lines and common electrode wires, thereby avoiding the bad display caused by the light reflection of the metal wires. In general, the touch layer 54 is also made of metal, and in order to avoid the bad display caused by the opening occupying ratio of the touch layer 54 or light reflection, preferably, in the light transmission direction, the non-light transmission region of the touch layer 54 and the non-light-transmission region of the light-shielding layer 58 are arranged in an overlapping way, i.e., the light-shielding layer 58 shelters the touch layer 54.

It should be noted that, in the touch liquid crystal display device provided in the embodiment of the invention, the touch layer 54 is arranged between the first substrate 51 and the liquid crystal layer 53. However, the embodiments of the invention is not limited thereto, and in the touch liquid crystal display device provided in another embodiment of the invention, the touch layer 54 may also be arranged between the second substrate 52 and the TFT array layer 55. The corresponding specific schematic structural diagram is well known for those skilled in the art, therefore it is not described herein.

It can be known from above that, in the prior art, the touch sensitivity of the liquid crystal display device is low, this is mainly because a parasitic capacitance is generated between the drive lines on the array substrate (or the common electrode on the array substrate) and the metal wires in the touch screen. Specifically, there are multiple transverse scanning drive lines on the array substrate, the transverse metal wires 21 are located right above the scanning drive lines, and the transverse metal wires 21 are in one-to-one correspondence with the scanning drive lines, thereby a parasitic capacitance is generated between each transverse metal wire 21 and its corresponding scanning drive line, influencing the mutual-capacitance 33 between the drive electrode 11 and the sensing electrode 12 in the touch layer, resulting in that the detection circuit 36 being difficult to detect the change of the signal at the mutual-capacitance 33, and reducing the touch sensitivity of the touch screen.

However, in the touch liquid crystal display device provided in the embodiments of the invention, the number of the transverse metal wires 71 is less than the number of the scanning drive lines, i.e., the transverse metal wires 71 in the touch layer 54 are not in one-to-one correspondence with the scanning drive lines any more, thereby reducing the area of the region on which the transverse metal wires 71 in the touch layer 54 is opposite the transverse metal wires 71 in the touch layer 54 and the scanning drive lines, reducing the parasitic capacitance between the transverse metal wires 71 in the touch layer 54 and the scanning drive lines, reducing influence on the mutual-capacitance between the drive electrode 61 and the sensing electrode 62, increasing the effective signal in the detection circuit, and improving the touch sensitivity of the touch liquid crystal display device.

It should be noted that, in the embodiment, the number of the transverse metal wires 71 being less than the number of the scanning drive lines can be explained as: the number of the transverse metal wires 71 in the drive electrodes 61 is less than the number of the scanning drive lines, and by reducing a drive parasitic capacitance between the transverse metal wires 71 in the drive electrode 61 and the scanning drive lines, the influence on the mutual-capacitance caused by the drive parasitic capacitance is reduced, thereby improving the touch sensitivity of the touch liquid crystal display device.

It may also be explained as: the number of the transverse metal wires 71 in the sensing electrodes 62 is less than the number of the scanning driving lines, by reducing a sensing parasitic capacitance between the transverse metal wires 71 in the sensing electrode 62 and the scanning drive lines, the influence on the mutual-capacitance caused by the sensing parasitic capacitance is reduced, thereby improving the touch sensitivity of the touch liquid crystal display device.

It may further be explained as: both the number of the transverse metal wires 71 in the drive electrodes 61 and the number of the transverse metal wires 71 in the sensing electrodes 62 are less than the number of the scanning drive lines, and by reducing not only the drive parasitic capacitance between the transverse metal wires 71 in the drive electrode 61 and the scanning drive lines, but also the sensing parasitic capacitance between the transverse metal wires 71 in the sensing electrode 62 and the scanning drive lines, the influence on the mutual-capacitance caused by both the drive parasitic capacitance and the sensing parasitic capacitance is reduced, thereby further improving the touch sensitivity of the touch liquid crystal display device.

Preferably, in the embodiments of the invention, a ratio of the number of the transverse metal wires 71 to the number of scanning drive lines ranges from 1:3 to 2:3, and endpoint values are included, thereby reducing the influence on the mutual-capacitance caused by the parasitic capacitance between the transverse metal wires 71 in the touch layer 54 and the scanning drive lines, increasing the effective signal in the detection circuit, improving the touch sensitivity of the touch liquid crystal display device, and making sure the effective touch area of the touch layer 54 in the touch liquid crystal display device.

Preferably, in the embodiments of the invention, the transverse metal wires 71 are arranged uniformly in the touch layer 54, thereby further making sure that the sensitivity of each touch point in the touch layer 54 is consistent.

Figure 8:
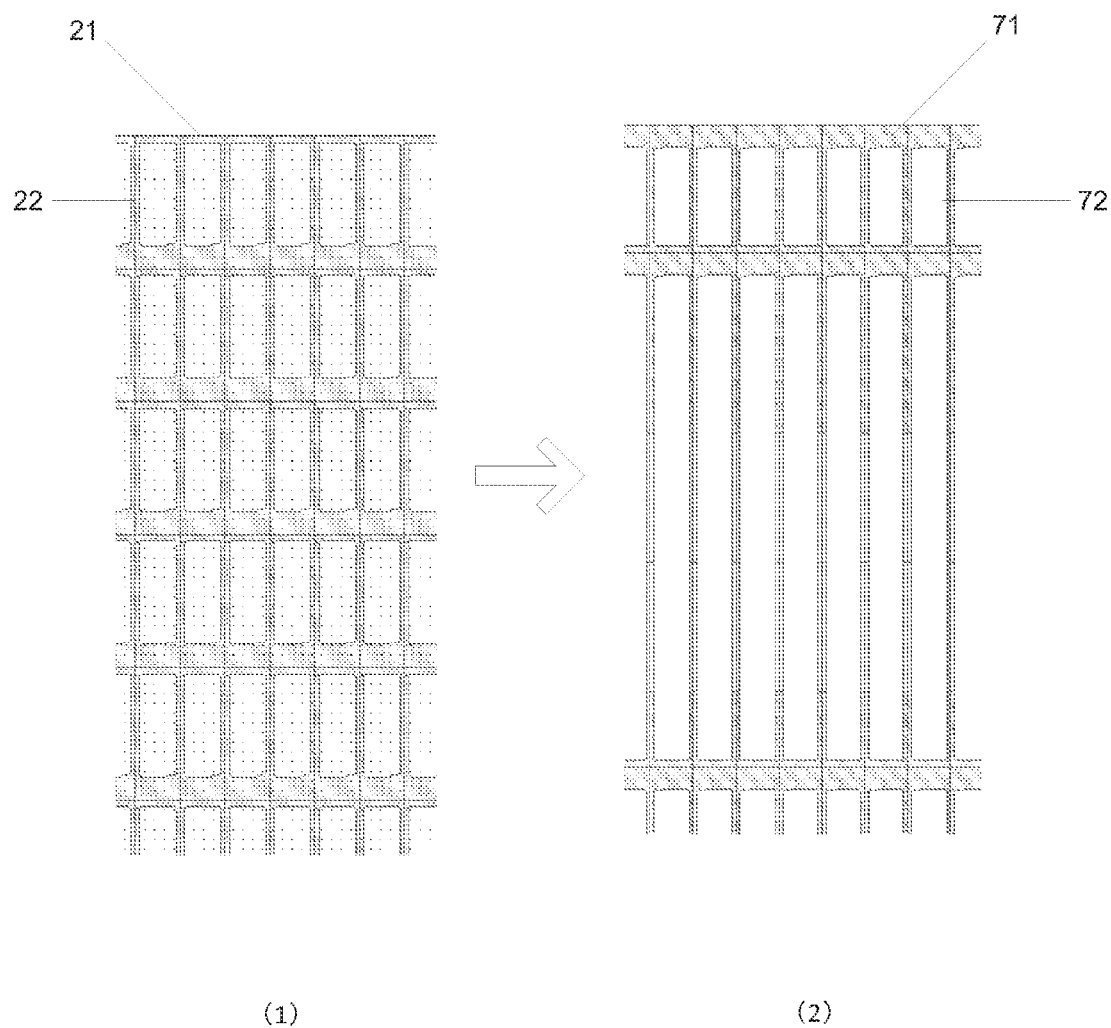
FIG. 8 is a schematic structural comparative diagram between an electrode in the region A of the single-layer touch screen shown in FIG. 1 and an electrode in the region B of the touch layer shown in FIG. 6.
Figure 9A:
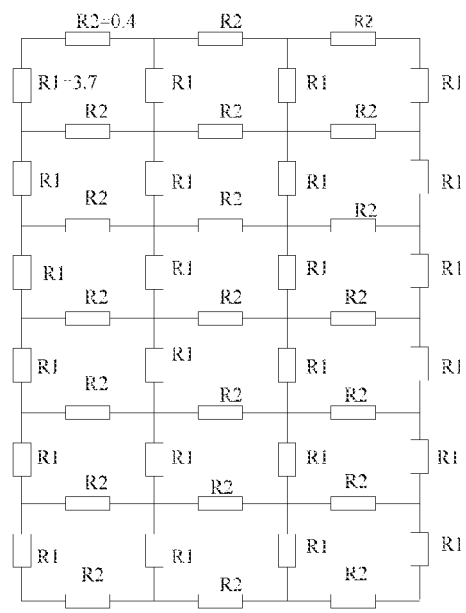
FIGS. 9A and 9B are a schematic diagram of equivalent resistance of electrodes in the region A and the region B described in FIG. 8.
Figure 9B:
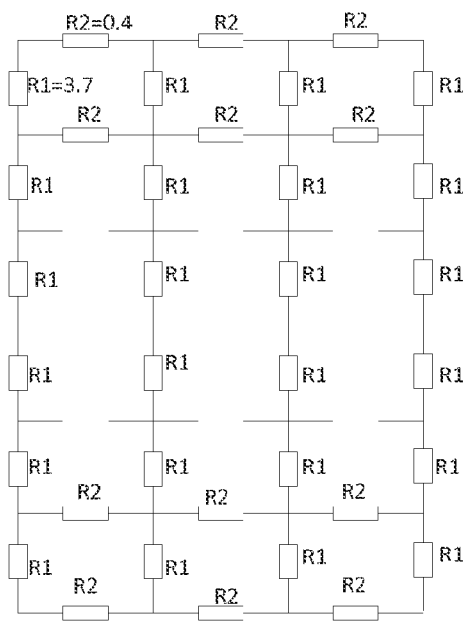

As shown in FIG. 8, in the case where the number of the transverse metal wires 71 in the touch layer 54 is reduced to half of the original one, the related parasitic capacitance is reduced to half of the original one accordingly, and the corresponding simulation schematic diagrams of the resistance circuit are shown as FIG. 9A and FIG. 9B. In the case where the number of the transverse metal wires 21 in part of the electrode does not change, as shown in FIG. 8 (1) and FIG. 9A, the equivalent resistance of the part of the electrode is 1.039 ohms. In the case where the number of the transverse metal wires 71 in the part of the electrode is reduced to half of the original one, as shown in FIG. 8 (2) and FIG. 9B, the equivalent resistance of the part of the electrode is 1.041 ohms. In other words, In the case where the number of the transverse metal wires 71 in the touch layer 54 is reduced to half of the original one, the parasitic capacitance between the transverse metal wires 71 in the touch layer 54 and the scanning drive lines/common electrodes is also reduced to half of the original one, the resistance of the electrodes in the touch layer 54 does not change greatly.

Figure 10:
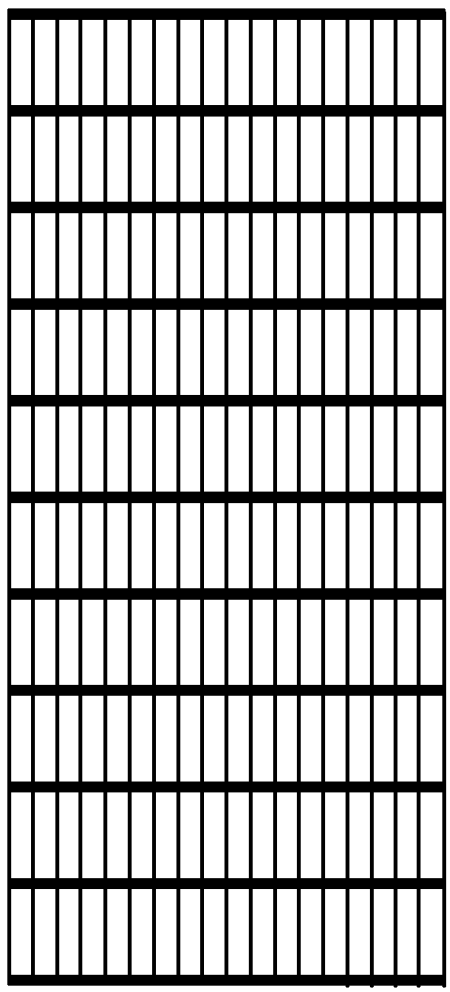
FIGS. 10 to 13 are schematic structural diagrams of an electrode grid provided according to an embodiment of the invention.
Figure 11:
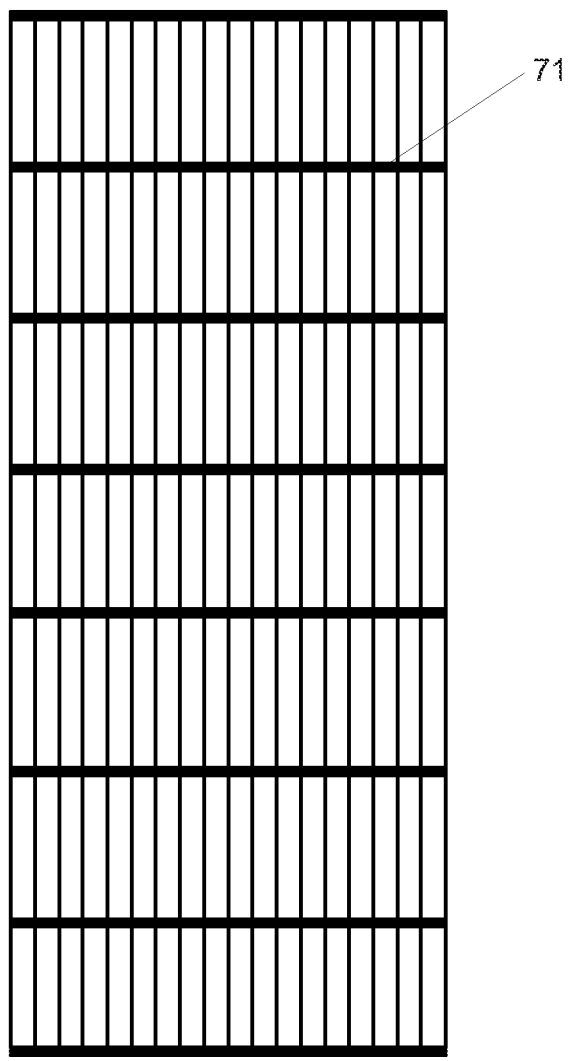
Figure 12:
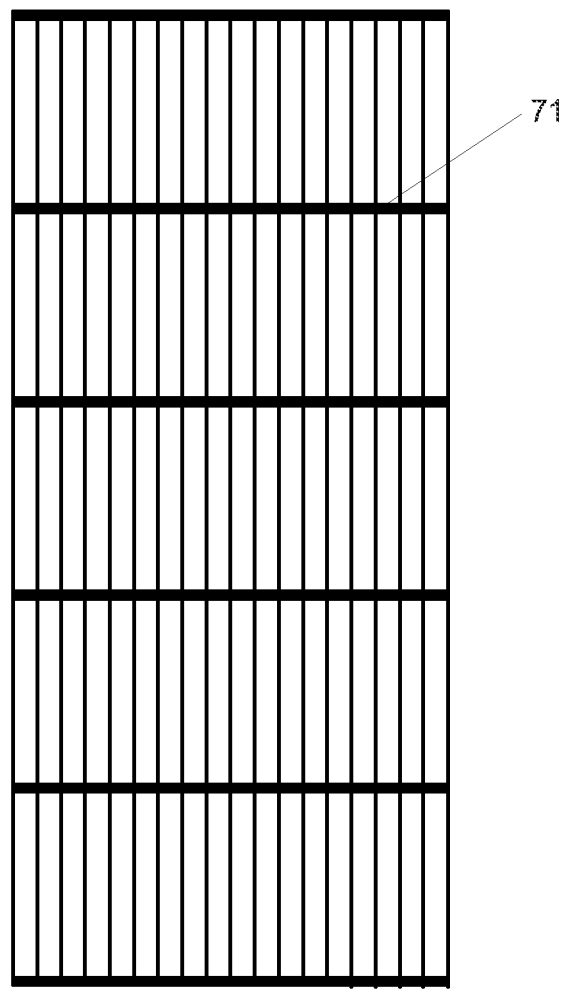
Figure 13:
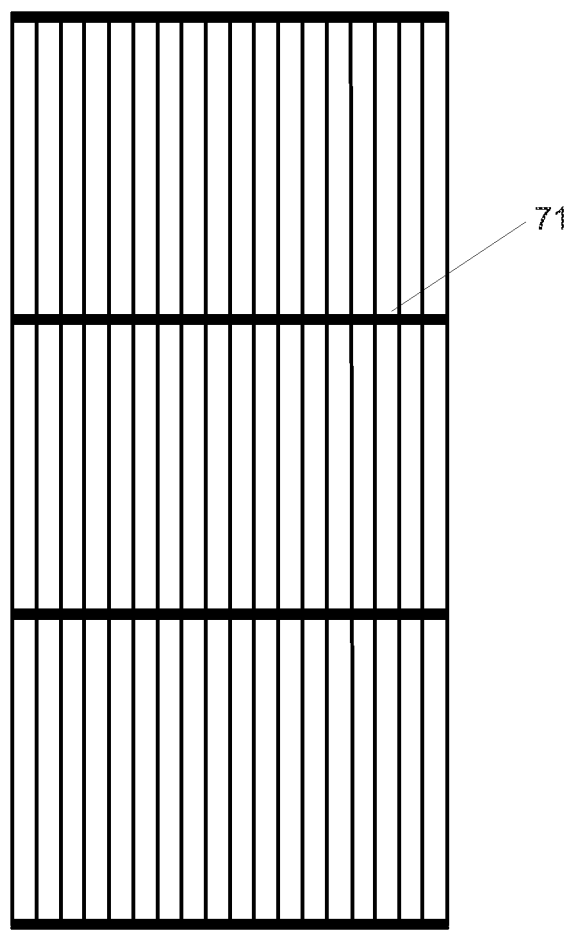

As shown in FIG. 10, by taking an electrode grid composed of 10*18 pixels as an example, the resistance of the electrode grid is 7.5 ohms. As shown in FIG. 11, in the case where the number of the traverse metal wires 71 in the touch layer 54 is reduced to ⅔ of the original one, the related parasitic capacitance is reduced to ⅔ of the original one accordingly, while the corresponding resistance is only increased by 1/10 of the original one. As shown in FIG. 12, in the case where the number of the traverse metal wires 71 in the touch layer 54 is reduced to ½ of the original one, the related parasitic capacitance is also reduced to ½ of the original one, while the corresponding resistance is only increased by ⅕ of the original one. As shown in FIG. 13, in the case where the number of the traverse metal wires 71 in the touch layer 54 is reduced to ⅓ of the original one, the related parasitic capacitance is also reduced to ⅓ of the original one accordingly, while the corresponding resistance is only increased by less than ½ of the original one. It shows that reducing the number of the traverse metal wires 71 in the touch layer 54 can significantly reduce the related parasitic capacitance but can not significantly increase the corresponding resistance, i.e., reducing the number of the traverse metal wires 71 in the touch layer 54 is advantageous to significantly reduce the related parasitic capacitance.

In addition, it can be know from the preceding analysis that, in the touch liquid crystal display device, the parasitic capacitance is generated not only between the scanning drive lines and the transverse metal wires 71 in the touch layer 54, but also between the common electrode and the transverse metal wires 71 in the touch layer 54, and the parasitic capacitance between the common electrode and the transverse metal wires 71 in the touch layer 54 also influences the mutual-capacitance between the drive electrode 61 and the sensing electrode 62, and the touch sensitivity of the touch liquid crystal display device is reduced.

However, in the embodiments of the invention, the number of the transverse metal wires 71 is less than the number of the scanning drive lines, which will reduce not only the parasitic capacitance between the transverse metal wires 71 in the touch layer 54 and the scanning drive lines, but also the area of the region on which the traverse metal wires 71 in the touch layer 54 is opposite the common electrode, thereby reducing the parasitic capacitance between the transverse metal wires 71 in the touch layer 54 and the common electrode.

In addition, in an embodiment of the invention, in order to further reduce the parasitic capacitance between the traverse metal wires 71 and the scanning drive lines, the width of the traverse metal wires 71 is less than the width of the traverse drive lines. In which, the traverse drive lines are the scanning drive lines, preferably, the width of the traverse metal wires 71 ranges from 10 μm to 30 μm, and endpoint values are included, thereby reducing the area of the region on which the traverse metal wires 71 in the touch layer 54 are opposite the scanning drive lines, further reducing the influence on the mutual-capacitance between the drive electrode 61 and the sensing electrode 62 caused by the parasitic capacitance between the traverse metal wires 71 in the touch layer 54 and the scanning drive lines, increasing the effective signal in the detection circuit and improving the touch sensitivity of the touch liquid crystal display device.

It should be noted that, in the embodiment, the width of the traverse metal wires 71 being less than the width of the scanning drive lines may be explained as: the width of the traverse metal wires 71 in the drive electrode 61 is less than the width of the scanning drive lines, by reducing a drive parasitic capacitance between the traverse metal wires 71 in the drive electrode 61 and the scanning drive lines, the influence on the mutual-capacitance caused by the drive parasitic capacitance is reduced, thereby improving the touch sensitivity of the touch liquid crystal display device.

It may also be explained as: the width of the traverse metal wires 71 in the sensing electrode 62 is less than the width of scanning drive lines, by reducing a sensing parasitic capacitance between the traverse metal wires 71 in the sensing electrode 62 and the scanning drive lines, the influence on the mutual-capacitance caused by the sensing parasitic capacitance is reduced, thereby improving the touch sensitivity of the touch liquid crystal display device.

It may also be explained as: both the width of the traverse metal wires 71 in the drive electrode 61 and the width of the traverse metal wires 71 in the sensing electrode 62 are less than the width of the scanning drive lines, by simultaneously reducing the drive parasitic capacitance between the traverse metal wires 71 in the drive electrode 61 and the scanning drive lines as well as the sensing parasitic capacitance between the traverse metal wires 71 in the sensing electrode 62 and the scanning drive lines, the influence on the mutual-capacitance caused by both the drive parasitic capacitance and the sensing parasitic capacitance is reduced simultaneously, thereby improving the touch sensitivity of the touch liquid crystal display device.

Figure 14:
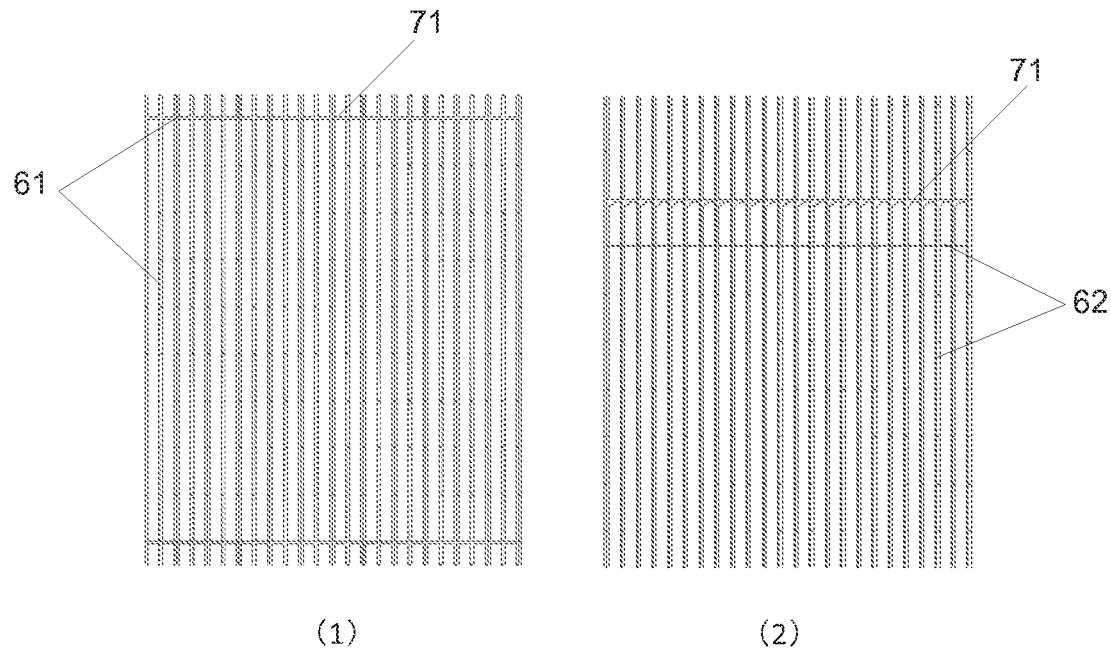
FIG. 14 is a schematic structural diagram of part of the drive electrode and part of the sensing electrode, in the touch liquid crystal display device provided according to an embodiment of the invention.

Furthermore, in the touch liquid crystal display device provided in the embodiments of the invention, the transverse metal wires 71 in the drive electrode 61 and the transverse metal wires 71 in the sensing electrode 62 may be arranged in stagger format, as shown in FIG. 14, in which FIG. 14 (1) is a schematic structural diagram of part of the drive electrode 61, and FIG. 14 (2) is a schematic structural diagram of part of the sensing electrode 62. Therefore, the same scanning drive line arranged on the array substrate can not couple the transverse metal wires 71 in the drive electrode 61 with the transverse metal wires 71 in the sensing electrode 62 together, thereby reducing the mutual-capacitance between the drive electrode 61 and the sensing electrode 62, further making sure that the change of the signal at the mutual-capacitance is large when the touch layer 54 is touched, increasing the effective signal in the detection circuit, and improving the touch sensitivity of the touch liquid crystal display device.

In summary, in the touch liquid crystal display device provided in the embodiments of the invention, the number of the transverse metal wires is less than the number of the scanning drive lines, thereby reducing the parasitic capacitance between the transverse metal wires and the scanning drive lines, and also reducing the parasitic capacitance between the transverse metal wires and the common electrode, further reducing not only the parasitic capacitance generated between the transverse metal wires in the touch layer and the scanning drive lines but also the parasitic capacitance generated between the transverse metal wires in the touch layer and the common electrode, increasing the effective signal in the detection circuit; furthermore the transverse metal wires in the drive electrode and the transverse metal wires in the sensing electrode are arranged in stagger format, further reducing the mutual-capacitance between the drive electrode and the sensing electrode, and improving the touch sensitivity of the touch liquid crystal display device.

The embodiment takes the single-layer touch screen as an example, but the embodiments of the invention is not limited to the single-layer touch screen structure; in a double-layer touch screen structure, it also exists the problem that a large parasitic capacitance is generated between the drive electrode, the sensing electrode, the drive lines and the common electrode, the influence can be reduced by utilizing the structure provided in the embodiments of the invention. Possible variations and modifications about the technical solutions of the embodiment of the invention can be made by those skilled in the art based on the method and technical content disclosed above, without departing from the spirit and scope of the invention. Therefore, any simple changes, equivalent variations and modifications made to the above embodiments based on the technical essence of the invention without departing the content of the technical solutions of the embodiments of the invention fall within the scope of protection of the technical solutions of the embodiments of the invention.

In the embodiment, a touch liquid crystal display device provided in the embodiments of the invention is introduced by assuming a touch layer in the touch liquid crystal display device is a single-layer touch layer. The embodiment differs from the embodiment corresponding to FIG. 5 in that, a drive electrode and a sensing electrode adjacent to each other in the touch layer are arranged in a vertical direction. In the case where the drive electrode and the sensing electrode adjacent to each other in the touch layer are arranged in a vertical direction or the extending direction of data drive lines, the number of the vertical metal wires in the drive electrode or the sensing electrode may be set to be less than the number of the vertical drive lines, i.e., the number of the vertical metal wires in the drive electrode or the sensing electrode is set to be less than the number of the data drive lines, thereby reducing a parasitic capacitance between the vertical metal wires in the touch layer and the data drive lines, also reducing a parasitic capacitance between the vertical metal wires and a common electrode of the liquid crystal display device, and further improving the touch sensitivity.

Similarly, in the embodiment, the number of the vertical metal wires being less than the number of the data drive lines can be explained as: the number of the vertical metal wires in the drive electrodes is less than the number of the data drive lines, and by reducing a drive parasitic capacitance between the vertical metal wires in the drive electrode and the data drive lines, the influence on the mutual-capacitance caused by the drive parasitic capacitance is reduced, thereby improving the touch sensitivity of the touch liquid crystal display device.

It may also be explained as: the number of the vertical metal wires in the sensing electrodes is less than the number of the data drive lines, and by reducing a sensing parasitic capacitance between the vertical metal wires in the sensing electrode and the data drive lines, the influence on the mutual-capacitance caused by the sensing parasitic capacitance is reduced, thereby improving the touch sensitivity of the touch liquid crystal display device.

It may also be explained as: both the number of the vertical metal wires in the drive electrode and the number of the vertical metal wires in the sensing electrodes are less than the number of the data drive lines, and by reducing not only the drive parasitic capacitance between the vertical metal wires in the drive electrode and the data drive lines, but also the sensing parasitic capacitance between the vertical metal wires in the sensing electrode and the data drive lines, the influence on the mutual-capacitance caused by both the drive parasitic capacitance and the sensing parasitic capacitance is reduced, thereby further improving the touch sensitivity of the touch liquid crystal display device.

Preferably, in the embodiments of the invention, a ratio of the number of the vertical metal wires to the number of the data drive lines ranges from 1:3 to 2:3, and endpoint values are included, thereby reducing the influence on the mutual-capacitance caused by the parasitic capacitance between the vertical metal wires in the touch layer and the data drive lines, increasing the effective signal in the detection circuit, improving the touch sensitivity of the touch liquid crystal display device, and making sure the effective touch area of the touch layer in the touch liquid crystal display device.

Preferably, in the embodiments of the invention, the vertical metal wires are arranged uniformly in the touch layer, therefore further making sure that the sensitivity of each touch point in the touch layer is consistent.

In addition, in one embodiment of the invention, in order to further reduce the parasitic capacitance between the vertical metal wires and the data drive lines, the width of the vertical metal wires is less than the width of the vertical drive lines, preferably, the width of the vertical metal wires ranges from 10 µm to 30 µm, and endpoint values are included, thereby reducing the parasitic capacitance between the vertical metal wires in the touch layer and the data drive lines, and reducing the parasitic capacitance between the vertical metal wires and a common electrode of the liquid crystal display device, thereby improving the touch sensitivity.

Similarly, in the embodiment, the width of the vertical metal wires being less than the width of the vertical drive lines may be explained as: the width of the vertical metal wires in the drive electrode is less than the width of the data drive lines, by reducing a drive parasitic capacitance between the vertical metal wires in the drive electrode and the data drive lines, the influence on the mutual-capacitance caused by the drive parasitic capacitance is reduced, thereby improving the touch sensitivity of the touch liquid crystal display device.

It may also be explained as: the width of the vertical metal wires in the sensing electrode is less than the width of the data drive lines, by reducing the drive parasitic capacitance between the vertical metal wires in the sensing electrode and the data drive lines, the influence on the mutual-capacitance caused by the sensing parasitic capacitance is reduced, thereby improving the touch sensitivity of the touch liquid crystal display device.

It may also be explained as: both the width of the vertical metal wires in the drive electrode and the width of the vertical metal wires in the sensing electrode are less than the width of the data drive lines, by simultaneously reducing the drive parasitic capacitance between the vertical metal wires in the drive electrode and the data drive lines as well as the sensing parasitic capacitance between the vertical metal wires in the sensing electrode and the data drive lines, the influence on the mutual-capacitance caused by the drive parasitic capacitance and the sensing parasitic capacitance is reduced, thereby further improving the touch sensitivity of the touch liquid crystal display device.

Furthermore, the vertical metal wires in the drive electrode and the vertical metal wires in the sensing electrode may be arranged in stagger format, thereby reducing the area of the region on which the vertical metal wires in the drive electrode are opposite the transverse metal wires in the sensing electrode. Therefore, the same data drive line provided on the array substrate can not couple the vertical metal wires in the drive electrode with the vertical metal wires in the sensing electrode together, and the mutual-capacitance between the drive electrode and the sensing electrode is reduced, thereby making sure that the change of the signal at the mutual-capacitance relative to the mutual-capacitance is large when the touch layer is touched, increasing the effective signal in the detection circuit, and improving the touch sensitivity of the touch liquid crystal display device.

A touch liquid crystal display device provided in an embodiment of the invention includes: a first substrate and a second substrate arranged oppositely, and a liquid crystal layer located between the first substrate and the second substrate, the first substrate is a color film substrate, the second substrate is an array substrate, in which, a touch layer is formed on the inner side of the first substrate towards the second substrate. The touch layer is provided with multiple drive electrodes and sensing electrodes, and each of the drive electrode and the sensing electrode is composed of multiple traverse metal wires and vertical metal wires interlaced with each other, i.e., each of the drive electrode and the sensing electrode is a metal grid composed of multiple traverse metal wires and vertical metal wires interlaced with each other, and the drive electrode and the sensing electrode adjacent to each other are arranged in a traverse direction. From bottom to top, the second substrate is provided with a TFT array layer, a pixel electrode layer and a common electrode layer in sequence, in which, the TFT array layer includes multiple traverse drive lines (i.e., scanning drive lines), and the width of the traverse metal wires is less than the width of the traverse drive lines, thereby reducing the area of the region on which the traverse metal wires in the touch layer are opposite the traverse drive lines, thereby reducing the influence on a mutual-capacitance between the drive electrode and the sensing electrode caused by a parasitic capacitance between the traverse metal wires in the touch layer and the traverse drive lines, increasing the effective signal in the detection circuit, and improving the touch sensitivity of the touch liquid crystal display device.

It should be noted that, in the embodiment, the width of the traverse metal wires being less than the width of the scanning drive lines may be explained as: the width of the traverse metal wires in the drive electrode is less than the width of the scanning drive lines, by reducing a drive parasitic capacitance between the traverse metal wires in the drive electrode and the traverse drive lines, the influence on the mutual-capacitance caused by the drive parasitic capacitance is reduced, thereby improving the touch sensitivity of the touch liquid crystal display device.

It may also be explained as: the width of the traverse metal wires in the sensing electrode is less than width of the traverse drive lines, by reducing a sensing parasitic capacitance between the traverse metal wires in the sensing electrode and the traverse drive lines, the influence on the mutual-capacitance caused by the sensing parasitic capacitance is reduced, thereby improving the touch sensitivity of the touch liquid crystal display device.

It may also be explained as: both the width of the traverse metal wires in the drive electrode and the width of the traverse metal wires in the sensing electrode are less than the width of the traverse drive lines, by simultaneously reducing the drive parasitic capacitance between the traverse metal wires in the drive electrode and the scanning drive lines as well as the sensing parasitic capacitance between the traverse metal wires in the sensing electrode and the scanning drive lines, the influence on the mutual-capacitance caused by both the drive parasitic capacitance and the sensing parasitic capacitance is reduced simultaneously, further improving the touch sensitivity of the touch liquid crystal display device.

Figure 15:
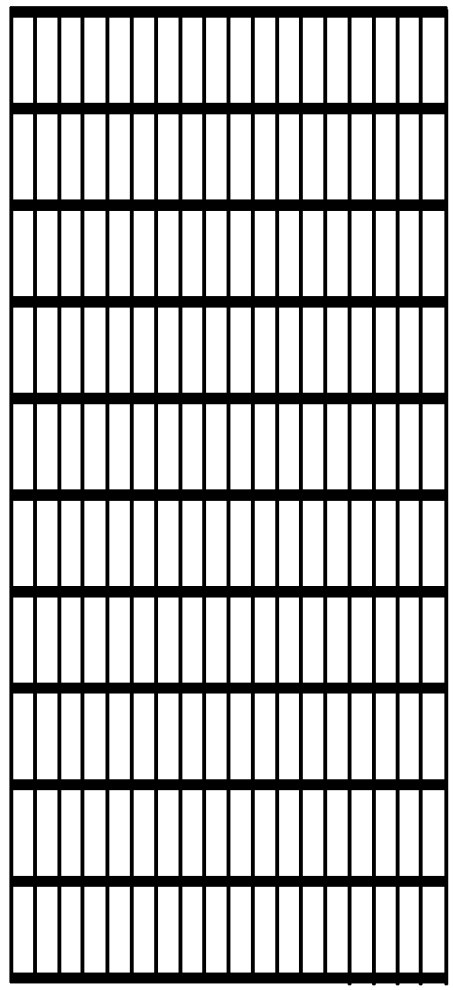
FIGS. 15 to 18 are schematic structural diagrams of an electrode grid provided according to another embodiment of the invention.
Figure 16:
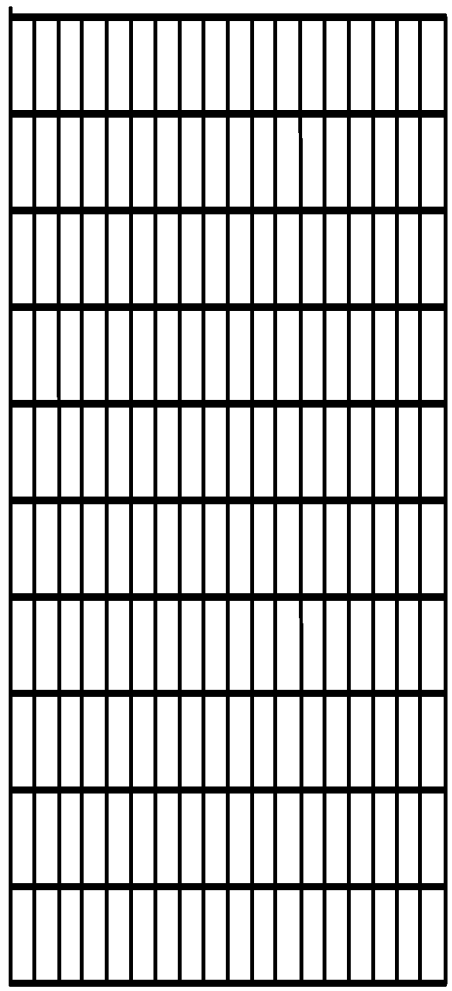
Figure 17:
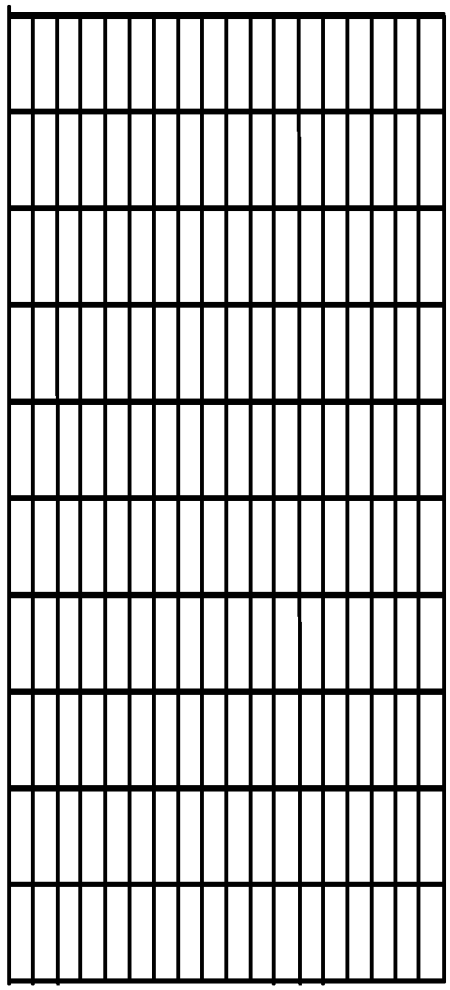
Figure 18:
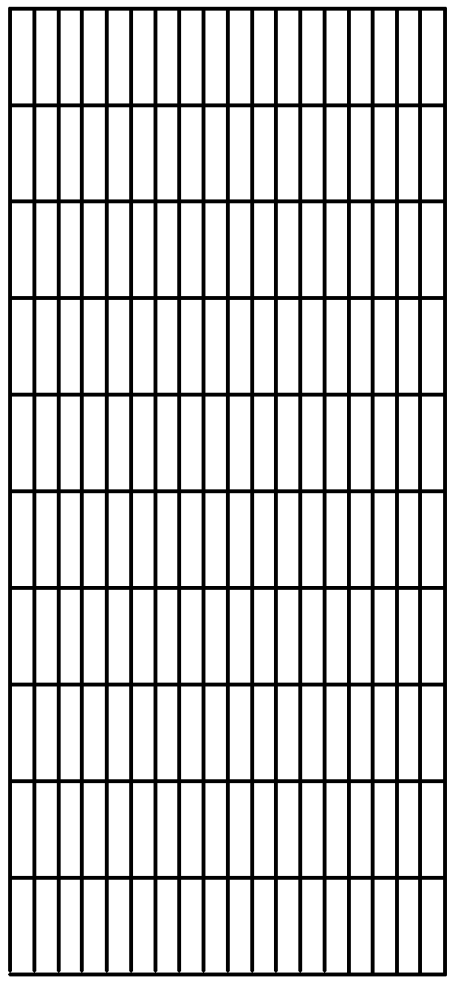

Preferably, in the touch liquid crystal display device provided by in embodiments of the invention, the width of the traverse metal wires ranges from 10 μm to 30 μm, endpoint values are included. By taking an electrode grid composed of 10*18 pixels as an example, as shown in FIG. 15, in the case where the width of the traverse metal wires is 30 μm, its resistance is 4.6 ohms. As shown in FIG. 16, in the case where the width of the traverse metal wires is 20 μm, the corresponding parasitic capacitance is reduced to ⅔ of the original one, while the resistance of the traverse metal wires is 5.5 ohms. As shown in FIG. 17, in the case where the width of the traverse metal wires is 15 μm, the corresponding parasitic capacitance is reduced to ½ of the original one, while the resistance of the traverse metal wires is 6.3 ohms. As shown in FIG. 18, in the case where the width of the traverse metal wires is 10 μm, the corresponding parasitic capacitance is reduced to ⅓ of the original one, while the resistance of the traverse metal wires is 7.5 ohms. It shows that, by reducing the width of the traverse metal wires, the related parasitic capacitance can be reduced significantly, but the corresponding resistance can not be increased significantly, i.e., reducing the width of the traverse metal wires in the touch layer is advantageous to significantly reduce the related parasitic capacitance.

In addition, in the touch liquid crystal display device provided in the embodiments of the invention, the traverse metal wires in the drive electrode and the traverse metal wires in the sensing electrode may be arranged in stagger format, such that the same scanning drive line provided on the array substrate may not couple the traverse metal wires in the drive electrode with the traverse metal wires in the sensing electrode together, the mutual-capacitance between the drive electrode and the sensing electrode is reduced, thereby making sure that the change of the signal at the mutual-capacitance is large when the touch layer is touched, increasing the effective signal in the detection circuit, thereby improving the touch sensitivity of the touch liquid crystal display device.

In summary, in the touch liquid crystal display device provided in the embodiments of the invention, the width of the traverse metal wires is less than the width of the scanning drive lines, reducing the overlap metal area between the traverse metal wires and the scanning drive lines, thereby reducing the parasitic capacitance between the traverse metal wires and the scanning drive lines, and reducing the parasitic capacitance between the traverse metal wires and the common electrode, thereby reducing the parasitic capacity generated between the traverse metal wires in the touch layer and the scanning drive lines as well as the parasitic capacitance generated between the traverse metal wires in the touch layer and the common electrode, and increasing the effective signal in the detection circuit.

The embodiment differs from the embodiment corresponding to FIG. 5 in that: the drive electrode and the sensing electrode adjacent to each other in the touch layer are arranged in a vertical direction. In the case where the drive electrode and the sensing electrode adjacent to each other in the touch layer are arranged in a vertical direction or the extending direction of the data drive lines, the width of the vertical metal wires in the drive electrode and/or the sensing electrode is set to be less than the width of the data drive lines, reducing a parasitic capacitance between the vertical metal wires in the touch layer and the data drive lines as well as the parasitic capacitance between the vertical metal wires and the common electrode of the liquid crystal display device, further improving the touch sensitivity.

Similarly, in the embodiment, the width of the vertical metal wires being less than the width of the vertical drive lines (i.e., the data drive lines) may be explained as: the width of the vertical metal wires in the drive electrode is less than the width of the data drive lines, by reducing a drive parasitic capacitance between the vertical metal wires in the drive electrode and the data drive lines, the influence on the mutual-capacitance caused by the drive parasitic capacitance is reduced, thereby improving the touch sensitivity of the touch liquid crystal display device.

It may also be explained as: the width of the vertical metal wires in the sensing electrode is less than the width of the data drive lines, by reducing a sensing parasitic capacitance between the vertical metal wires in the sensing electrode and the data drive lines, the influence on the mutual-capacitance caused by the sensing parasitic capacitance is reduced, thereby improving the touch sensitivity of the touch liquid crystal display device.

It may also be explained as: both the width of the vertical metal wires in the drive electrode and the width of the vertical metal wires in the sensing electrode are less than the width of the data drive lines, by simultaneously reducing the drive parasitic capacitance between the vertical metal wires in the drive electrode and the data drive lines as well as the sensing parasitic capacitance between the vertical metal wires in the sensing electrode and the data drive lines, the influence on the mutual-capacitance caused by the drive parasitic capacitance and the sensing parasitic capacitance is reduced simultaneously, further improving the touch sensitivity of the touch liquid crystal display device.

In addition, the vertical metal wires in the drive electrode and the vertical metal wires in the sensing electrode may be arranged in stagger format, thereby reducing the area of the region on which the vertical metal wires in the drive electrode are opposite the vertical metal wires in the sensing electrode, such that the same data drive line provided on the array substrate may not couple the vertical metal wires in the drive electrode with the vertical metal wires in the sensing electrode together, reducing the mutual-capacitance between the drive electrode and the sensing electrode, thereby making sure that the change of the signal at the mutual-capacitance relative to the mutual-capacitance is large when the touch layer is touched, increasing the effective signal in the detection circuit, thereby improving the touch sensitivity of the touch liquid crystal display device.

In summary, in the touch liquid crystal display device provided in the embodiments of the invention, the width of the vertical metal wires is less than the width of the vertical drive lines, reducing the overlap metal area between the vertical metal wires and the vertical drive lines, thereby reducing the parasitic capacitance between the vertical metal wires and the vertical drive lines as well as the parasitic capacitance between the vertical metal wires and the common electrode, thereby reducing the parasitic capacitance generated between the vertical metal wires in the touch layer and the vertical drive lines as well as the parasitic capacitance generated between the vertical metal wires in the touch layer and the common electrode, and increasing the effective signal in the detection circuit.

Although the preferred embodiments of the invention are disclosed above, it is not intended to limit the invention. Possible variations and modifications about the technical solutions of the invention can be made by those skilled in the art based on the method and technical content disclosed above, without departing from the spirit and scope of the invention. Therefore, any simple changes, equivalent variations and modifications made to the above embodiments based on the technical essence of the invention without departing from the content of the technical solutions of the invention fall within the scope of protection of the technical solutions of the invention.

What is claimed is:

1. A touch liquid crystal display device, comprising:
   a first substrate;
   a touch layer being formed on the first substrate to detect a touch point, the touch layer comprising,
      a plurality of drive electrodes each comprising a plurality of transverse metal wires and a plurality of vertical metal wires; and
      a plurality of sensing electrodes each comprising a plurality of transverse metal wires and a plurality of vertical metal wires;
      wherein the transverse metal wires and vertical metal wires of the drive electrode are interlaced with each other and form a first grid of areas, wherein the transverse metal wires and vertical metal wires of the sensing electrode are interlaced with each other and form a second grid of areas, wherein a touch location is determined by a change of the capacitance between one of the first grid of areas and one of the second grid of areas associated with the touch point;
   a second substrate facing the first substrate at the touch layer side, the second substrate comprising,
      a TFT layer, on the second substrate's inside surface, forming a third grid of areas each having a plurality of transverse drive lines and a plurality of vertical drive lines;
      wherein the metal wire density in the first grid or the metal wire density in the second grid on the touch layer is less than the line density of the third grid on the TFT layer;
   and a liquid crystal layer sandwiched in between the first and the second substrates.

2. The touch liquid crystal display device according to claim 1, wherein adjacent drive and sensing electrodes are arranged in a transverse direction.

3. The touch liquid crystal display device according to claim 2, wherein at least one of:

a) the number of transverse metal wires of the drive electrodes is less than the number of transverse drive lines;
b) the number of transverse metal wires of the sensing electrodes is less than the number of transverse drive lines; or
c) the number of transverse metal wires of the drive electrodes is less than the number of transverse drive lines and the number of transverse metal wires of the sensing electrodes is less than the number of transverse drive lines.

4. The touch liquid crystal display device according to claim 3, wherein the width of the traverse metal wires is less than the width of the traverse drive lines.

5. The touch liquid crystal display device according to claim 4, wherein the width of the traverse metal wires is between about 10 μm and 30 μm.

6. The touch liquid crystal display device according to claim 2, wherein the transverse metal wires of adjacent drive and sensing electrodes are staggered.

7. The touch liquid crystal display device according to claim 1, wherein adjacent drive and sensing electrodes are arranged in a vertical direction.

8. The touch liquid crystal display device according to claim 7, wherein at least one of:
a) the number of vertical metal wires of the drive electrodes is less than the number of vertical drive lines;
b) the number of vertical metal wires of the sensing electrodes is less than the number of vertical drive lines; or
c) the number of vertical metal wires of the drive electrode is less than the number of vertical drive lines and the number of vertical metal wires of the sensing electrode is less than the number of vertical drive lines.

9. The touch liquid crystal display device according to claim 8, wherein the width of the vertical metal wires is less than the width of the vertical drive lines.

10. The touch liquid crystal display device according to claim 9, wherein the width of the vertical metal wires is between about 10 μm and 30 μm.

11. The touch liquid crystal display device according to claim 7, wherein vertical metal wires of adjacent drive and sensing electrodes are staggered.

12. The touch liquid crystal display device according to claim 1, wherein the transverse drive line is a scanning drive line, and the vertical drive line is a data drive line.

13. The touch liquid crystal display device according to claim 1, wherein a ratio of the number of the transverse metal wires to the number of the transverse drive lines or a ratio of the number of the vertical metal wires to the number of the vertical drive lines is between about 1:3 and 2:3.

14. The touch liquid crystal display device according to claim 1, wherein the transverse metal wires or the vertical metal wires are arranged uniformly in the touch layer.

15. The touch liquid crystal display device according to claim 1, wherein a light-shielding layer is provided between the first substrate and the touch layer, and wherein in a direction perpendicular to the light-shielding layer, a projection of a light transmission region of the touch layer on the light-shielding layer is in a light transmission region of the light-shielding layer.

16. A touch liquid crystal display device comprising:
a first substrate;
a touch layer being formed on the first substrate to detect a touch point, the touch layer comprising,
a plurality of drive electrodes each comprising a plurality of transverse metal wires and a plurality of vertical metal wires, and
a plurality of sensing electrodes each comprising a plurality of transverse metal wires and a plurality of vertical metal wires,
wherein the transverse metal wires and vertical metal wires of the drive electrode are interlaced with each other and form a first grid of areas, wherein the transverse metal wires and vertical metal wires of the sensing electrode are interlaced with each other and form a second grid of areas, wherein a touch location is determined by a change of the capacitance between one of the first grid of areas and one of the second grid of areas associated with the touch point;
a second substrate facing the first substrate at the touch layer side, the second substrate comprising,
a TFT layer, on the second substrate's inside surface, forming a third grid of areas each having a plurality of transverse drive lines and a plurality of vertical drive lines,
wherein the width of the traverse metal wire in the first grid or the width of the traverse metal wire in the second grid on the touch layer is less than the width of the traverse line in the third grid on the TFT layer; or the width of the vertical metal wire in the first grid or the width of the vertical metal wire in the second grid on the touch layer is less than the width of the vertical line in the third grid on the TFT layer;
and a liquid crystal layer sandwiched in between the first and the second substrates.

17. The touch liquid crystal display device according to claim 16, wherein adjacent drive and sensing electrodes are arranged in a traverse direction.

18. The touch liquid crystal display device according to claim 17, wherein at least one of:
a) the width of the traverse metal wires of the drive electrode is less than width of the traverse drive lines;
b) the width of the traverse metal wires of the sensing electrode is less than the width of the traverse drive lines; or
c) the width of the traverse metal wires of the drive electrode is less than the width of the traverse drive lines and the width of the traverse metal wires of the sensing electrode is less than the width of the traverse drive lines.

19. The touch liquid crystal display device according to claim 18, wherein the width of the traverse metal wires is between about 10 μm and 20 μm.

20. The touch liquid crystal display device according to any one of claim 17, wherein the traverse metal wires of adjacent drive and sensing electrodes are staggered.

21. The touch liquid crystal display device according to claim 17, wherein adjacent drive and sensing electrodes are arranged in a vertical direction.

22. The touch liquid crystal display device according to claim 21, wherein at least one of:
a) the width of the vertical metal wires of the drive electrode is less than the width of the vertical drive lines;
b) the width of the vertical metal wires of the sensing electrode is less than the width of the vertical drive lines; or
c) the width of the vertical metal wires of the drive electrode is less than the width of the vertical drive lines and the width of the vertical metal wires of the sensing electrode is less than the width of the vertical drive lines.

23. The touch liquid crystal display device according to claim 22, wherein the width of the vertical metal wires is between about 10 μm and 20 μm.

24. The touch liquid crystal display device according to any one of claim 21, wherein the vertical metal wires of adjacent drive and sensing electrodes are staggered.

\* \* \* \* \*